(12) United States Patent
Renfrow et al.

(10) Patent No.: US 10,751,648 B1
(45) Date of Patent: Aug. 25, 2020

(54) APPARATUS AND SYSTEM FOR REMOVING LIQUID FROM SLURRY

(71) Applicants: Durwood Nelson Renfrow, Kenly, NC (US); Mitchell Blake Hurley, Micro, NC (US)

(72) Inventors: Durwood Nelson Renfrow, Kenly, NC (US); Mitchell Blake Hurley, Micro, NC (US)

(*) Notice: Subject to any disclaimer, the term of this patent is extended or adjusted under 35 U.S.C. 154(b) by 0 days.

(21) Appl. No.: 16/852,599

(22) Filed: Apr. 20, 2020

Related U.S. Application Data

(60) Provisional application No. 62/884,957, filed on Aug. 9, 2019.

(51) Int. Cl.
| | | |
|---|---|---|
| *B01D 29/64* | (2006.01) | |
| *B01D 29/54* | (2006.01) | |
| *C02F 1/00* | (2006.01) | |
| *C02F 1/56* | (2006.01) | |
| *B01D 29/15* | (2006.01) | |
| *B01D 29/23* | (2006.01) | |
| *B01D 29/90* | (2006.01) | |
| *C02F 3/30* | (2006.01) | |
| *B01D 29/11* | (2006.01) | |
| *C02F 103/20* | (2006.01) | |

(52) U.S. Cl.
CPC ............ *B01D 29/54* (2013.01); *B01D 29/115* (2013.01); *B01D 29/118* (2013.01); *B01D 29/15* (2013.01); *B01D 29/23* (2013.01); *B01D 29/6476* (2013.01); *B01D 29/90* (2013.01); *C02F 1/004* (2013.01); *C02F 1/56* (2013.01); *C02F 3/302* (2013.01); *C02F 2103/20* (2013.01)

(58) Field of Classification Search
CPC .... B01D 29/115; B01D 29/118; B01D 29/54; B01D 29/603; B01D 29/606; B01D 29/6476; B01D 29/94; C02F 1/56; C02F 3/302
USPC .... 210/87, 90, 107, 332, 338, 342, 414, 415
See application file for complete search history.

(56) References Cited

U.S. PATENT DOCUMENTS

| | | | | |
|---|---|---|---|---|
| 2,387,368 | A * | 10/1945 | Vokes ................... | B01D 29/54 210/443 |
| 2,408,741 | A * | 10/1946 | Dodge ............... | B01D 29/6476 210/355 |
| 4,085,050 | A * | 4/1978 | Gervasi ............. | B01D 29/6476 210/332 |
| 5,401,396 | A * | 3/1995 | Lescovich ........... | B01D 29/606 210/415 |

(Continued)

*Primary Examiner* — Christopher Upton
(74) *Attorney, Agent, or Firm* — NK Patent Law

(57) ABSTRACT

Liquid separator apparatus comprises a first screen assembly for screening fluids from slurry. The first screen assembly defines an enclosure. The apparatus also comprises a second screen assembly for screening fluids from the slurry and being disposed spaced-apart within the enclosure of the first screen assembly. A slurry pathway is defined between the first screen assembly and the second screen assembly. A first separated fluids stream pathway is defined outwardly of the first screen assembly, and a second separated fluids stream pathway is defined inwardly of the second screen assembly. An auger is positioned between the first screen assembly and the second screen assembly for advancing the slurry upwardly through the slurry pathway. A drive motor operates to turn the auger.

20 Claims, 13 Drawing Sheets

(56) References Cited

U.S. PATENT DOCUMENTS

| | | | |
|---|---|---|---|
| 7,073,433 B2 * | 7/2006 | Burke | B30B 9/121 |
| | | | 210/415 |
| 8,025,156 B2 * | 9/2011 | Tapp | B01D 29/6476 |
| | | | 210/415 |
| 8,192,624 B2 * | 6/2012 | Takao | B01D 33/11 |
| | | | 210/338 |
| 8,388,836 B1 * | 3/2013 | Fetterman, III | B01D 29/54 |
| | | | 210/414 |
| 2018/0251204 A1 * | 9/2018 | Klomfas | B01D 29/603 |

* cited by examiner

USDA-ARS Performance Review

Values are average of three replicate samples. Samples collected during a single run at Goshen Ridge Farm. Samples analyzed at ARS in Florence, SC

Analysis of Swine Wastewater before and after using new Solid

| Parameters | Influent | Effluent | % Removal |
|---|---|---|---|
| | mg/L | | % |
| Total Suspended Solids (TSS) | 10793 | 1323 | 87.7 |
| Volatile Suspended Solids (VSS) | 7687 | 995 | 87.1 |
| Total Nitrogen (TKN) | 876 | 646 | 26.2 |
| Total Phosphorus (TP) | 304 | 88 | 70.9 |

% Moisture and % solid of solids collected after using new solid Separator

| Sample ID | % Moisture | % Solid |
|---|---|---|
| Saparator Solids | 74.7 | 25.3 |

FIG. 14

APPARATUS AND SYSTEM FOR REMOVING LIQUID FROM SLURRY

CROSS-REFERENCE TO RELATED APPLICATIONS

This application claims priority to U.S. Provisional Patent Application No. 62/884,957 filed on Aug. 9, 2019 entitled APPARATUS AND SYSTEM FOR REMOVING LIQUID FROM SLURRY, the contents of which is incorporated by reference herein.

TECHNICAL FIELD

The present invention relates to removing liquid from slurry. In particular, the present invention relates to an improved process and apparatus for removing liquid from slurry such as swine waste.

BACKGROUND

Slurries are processed in many industries ranging from food processing to biofuel production. In the production of biofuels, for example, the addition of water or other liquid to the incoming feedstock to form a slurry facilitates the transportation and mechanical handling of the feedstock.

There is a growing impetus in several industries in recent years to reduce the liquid content of slurries to improve process economics. For example, large scale swine farming is an industry that generates high levels of swine waste, which has led to issues involving treatment of the swine waste. At a swine farm site, waste is typically removed by washing away waste that has accumulated within channels cut into the floor at the farm site. The mixture of waste and water is then collected at a downstream site and is deposited into a lagoon, which acts as a bio-reactive system that treats the waste through the reaction of bio-reactive material and enzymes. Due to recent changes in regulatory environment restricting the building of new swine lagoons, the use and placement of waste lagoons has become problematic in recent years. Furthermore, in instances when extreme and/or significant rainfall occur, the swine lagoons can overfill and overrun into the surrounding landscape. This in turn can result in damage to existing crop structures, soil, water, and sewer systems of the surrounding landscape.

Accordingly, a need exists for a method or solution that addresses these shortcomings in the art.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a liquid separator apparatus. In various embodiments, the apparatus comprises a first screen assembly for screening fluids from a slurry. The first screen assembly defines an enclosure. The apparatus further comprises a second screen assembly for screening fluids from the slurry and being disposed spaced-apart within the enclosure of the first screen assembly. A slurry pathway defined between the first screen assembly and the second screen assembly. A first separated fluids stream pathway defined outwardly of the first screen assembly; a second separated fluids stream pathway defined inwardly of the second screen assembly. An auger positioned between the first screen assembly and the second screen assembly for advancing the slurry upwardly through the slurry pathway. The apparatus additionally comprises a drive motor for turning the auger.

According to one or more embodiments, the apparatus further comprises a housing for enclosing the first screen assembly and the second screen assembly.

According to one or more embodiments, the first screen assembly and the second screen assembly are fixedly secured.

According to one or more embodiments, the apparatus further includes a pump for pumping the slurry to the liquid separator apparatus.

According to one or more embodiments, the pump is a progressive cavity pump.

According to one or more embodiments, the drive motor turns the auger through a belt and pulley drive mechanism.

According to one or more embodiments, the first screen assembly is cylindrically shaped and having a diameter of at least 10 inches, and the second screen assembly is cylindrically shaped and having a diameter of at most 9 inches. Further, the first screen assembly and the second screen assembly are coaxially aligned.

According to one or more embodiments, the apparatus further includes a vacuum source in communication with at least one of the first separated fluids stream pathway and the second separated fluids stream pathway.

According to one or more embodiments, the apparatus further includes a blade of the auger defines a helical plane.

According to one or more embodiments, each of the first screen assembly and the second screen assembly defines a wedge wire mesh having about a twenty-thousandths of an inch clearance.

According to one or more embodiments, the apparatus further includes a conveyor at a top portion in communication with the slurry pathway for conveying separated plug of material away from the apparatus.

According to one or more embodiments, the apparatus further includes a discharge auger at a top portion in communication with the slurry pathway for conveying separated plug of material away from the apparatus.

According to one or more embodiments, the apparatus further includes a flow restriction apparatus about a top portion of the slurry pathway for restricting flow-through until a desired parameter is reached.

According to one or more embodiments, the apparatus further includes an in-line polymer pump for adding a polymer to the slurry.

Disclosed herein is an automated system for removing liquid from a slurry. The automated system comprises a liquid separator apparatus. The liquid separator apparatus comprises a first screen assembly for screening fluids from a slurry, the first screen assembly defining an enclosure. The apparatus also comprises a second screen assembly for screening fluids from the slurry and being disposed spaced-apart within the first screen assembly. A slurry pathway is defined between the first screen assembly and the second screen assembly. A first separated fluids stream pathway is defined outwardly of the first screen assembly. A second separated fluids stream pathway is defined inwardly of the second screen assembly. An auger is positioned between the first screen assembly and the second screen assembly for advancing the slurry upwardly through the slurry pathway. The apparatus additionally comprises a drive motor for turning the auger. The automated system further includes a user interface configured for receiving a user input, and a controller configured to adjust at least one operating parameter associated with the liquid separator apparatus responsive to the user input received at the user interface.

According to one or more embodiments, the operating parameter comprises at least one of: a slurry pressure at an inlet to the apparatus, a slurry flow rate at the inlet to the apparatus, a flow rate of a plug of material at an outlet from the apparatus, a turning rate of the auger, and a rate of addition of a polymer to the slurry.

Disclosed herein is a system for treating a waste fluid stream. According to various embodiments, the system comprises a waste site having a slurry output, the slurry including a waste fluid stream. The system further comprises a liquid separator apparatus configured for separating the slurry into respective separated fluid streams. The liquid separator apparatus comprises a first screen assembly for screening fluids from a slurry, the first screen assembly defining an enclosure. The apparatus also comprises a second screen assembly for screening fluids from the slurry and being disposed spaced-apart within the first screen assembly. A slurry pathway is defined between the first screen assembly and the second screen assembly. A first separated fluids stream pathway is defined outwardly of the first screen assembly. A second separated fluids stream pathway is defined inwardly of the second screen assembly. An auger is positioned between the first screen assembly and the second screen assembly for advancing the slurry upwardly through the slurry pathway. The apparatus additionally comprises a drive motor for turning the auger.

According to one or more embodiments, the apparatus further includes a homogenization tank between the waste site and the liquid separator apparatus.

According to one or more embodiments, the apparatus further includes one of a denitrification unit and a nitrification unit—in fluid communication with the system.

According to one or more embodiments, the waste site is a livestock farm.

According to one or more embodiments, the apparatus further includes a lagoon for storing separated liquids.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 14 illustrates an example of the results obtained by processing swine waste through system for treating slurry as disclosed herein, according to one or more embodiments of the presently disclosed subject matter.

DETAILED DESCRIPTION OF EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Figure 1:
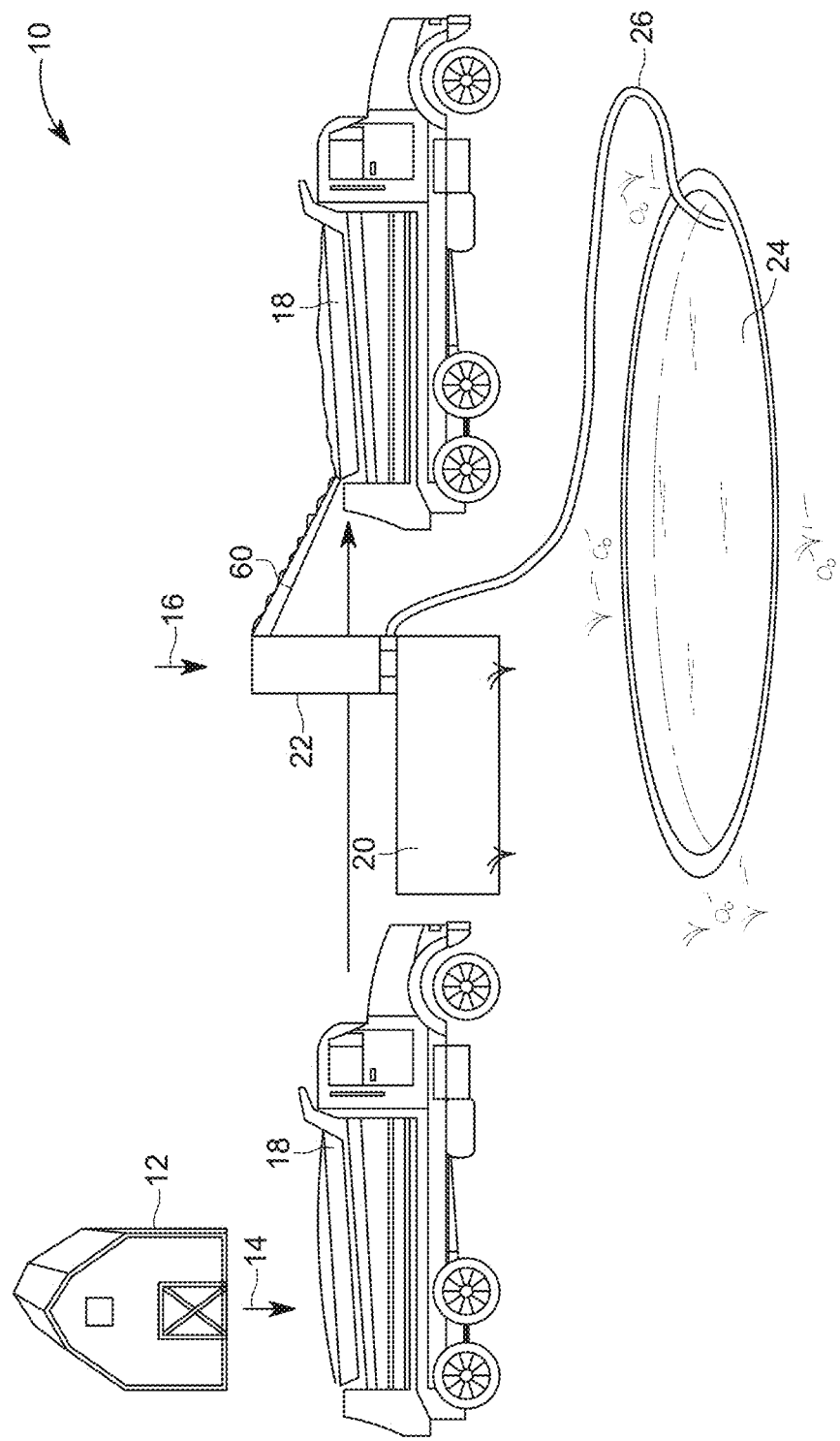
FIG. 1 is a schematic illustration of a system for treating slurry such as a waste fluid stream animal waste, according to one or more embodiments of the presently disclosed subject matter.

Embodiments of the presently disclosed subject matter advantageously operate to reduce the liquid content of a slurry to improve process economics. Embodiments of the presently disclosed subject matter provide for systems, methods and apparatuses for removing liquid from slurry. FIG. 1 is a schematic illustration of a system 10 for treating slurry such as a waste fluid stream animal waste according to one or more embodiments disclosed herein. The system 10 includes a waste site 12. The waste site 12 may be a swine house or similar. Alternatively, the waste site 12 may be any other site that has a waste fluid stream output 14. The waste fluid stream output 14 may be transported to a water separator assembly 16 by any appropriate manner. For example, in the schematic illustrated in FIG. 1, a transport vehicle 18 may be employed. The transport vehicle 18 may further dispose of the waste into a pump assembly 20 such as, for example, a progressive cavity pump that is configured for conveying the waste material to a liquid separator apparatus 22. In some alternate embodiments, the waste fluid stream animal waste can be directly conveyed to the pump assembly 20, eliminating the need for employing a transport vehicle 18. After processing in the liquid separator apparatus 22, the separated wastes are then transported to an additional site. In the schematic illustrated in FIG. 1, the additional site includes a lagoon 24 that is in fluid communication with the liquid separator apparatus 22 by a hose 26. The lagoon 24 may be optimally configured for receiving predominately liquid wastes, with the separated solid wastes being transported by the transport vehicle 18 for further processing or storage.

Accordingly, in various embodiments, system 10 can include a downstream processing unit configured for further processing of one of the separated first and second fluid streams. The system 10 can also include a homogenization tank between the waste site and the liquid separator apparatus. The system 10 can further include a denitrification unit and/or a nitrification unit in fluid communication with system 10.

Figure 2A:
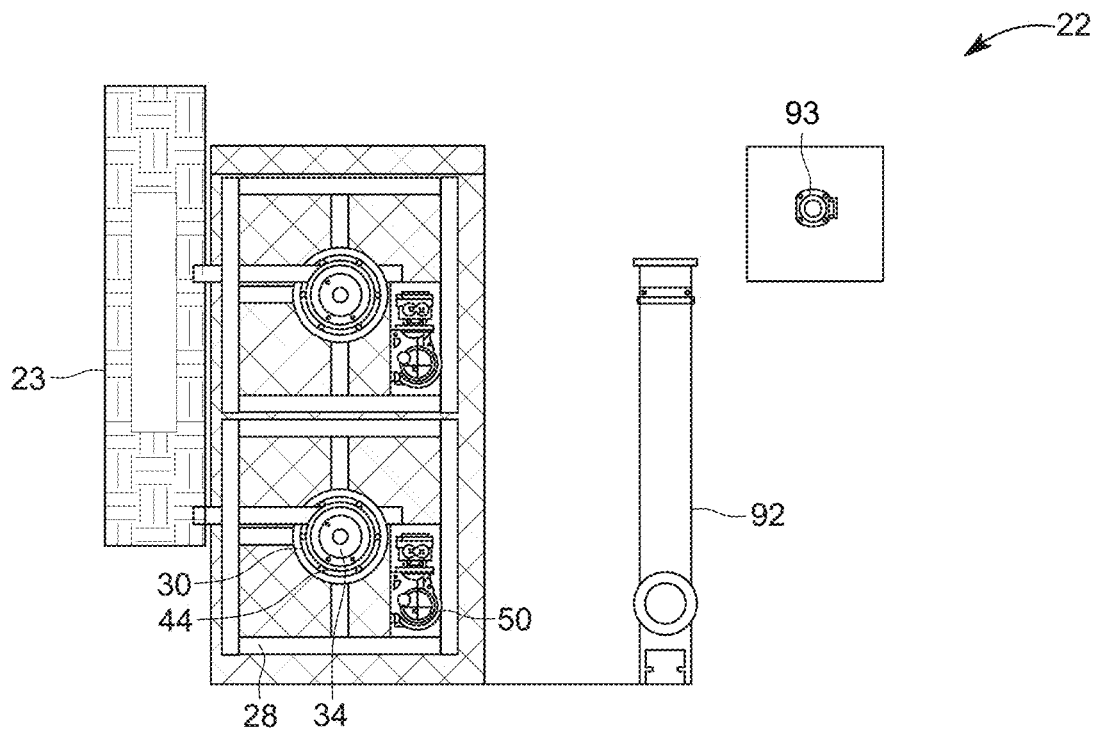
FIG. 2A illustrates a top plan view of two liquid separator apparatus forming part of a system for treating slurry; and, FIG. 2B illustrates a front plan view of a single liquid separator apparatus, according to one or more embodiments of the presently disclosed subject matter.
Figure 2B:
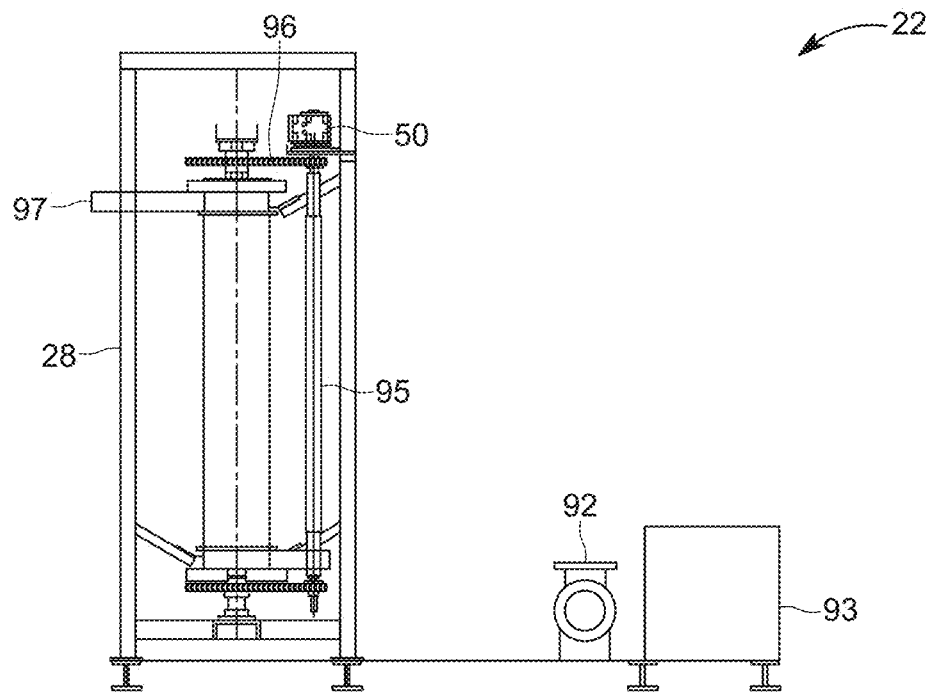

FIGS. 2 through 14 illustrate various aspects and components of system 10. FIG. 2 illustrates a plan view of the liquid separator apparatus 22 that forms part of system 10, according to at least one embodiment of the presently disclosed subject matter. FIG. 2A illustrates a top view of two liquid separator apparatus 22 placed next to each other. FIG. 2B illustrates a front plan view of a single liquid separator apparatus 22. FIGS. 2A and 2B further illustrate a conveyor assembly 23, a polymer sludge mix tank 93, and a sludge pump 92 forming part of system 10. Liquid separator apparatus 22 (hereinafter alternately referred to generally as "apparatus") is optimally configured for separating slurry that, in one embodiment, consists of waste fluid stream such as swine waste, into respective separated fluid streams—a first fluid stream exiting through a pathway defined outwardly of a first screen assembly 30 of the apparatus, a second fluid stream exiting through a pathway defined inwardly of a second screen assembly 34 of the apparatus, and a third stream comprising predominately of separated solids (e.g., a separated plug of material) exiting through a pathway positioned about a top portion of the apparatus. In one embodiment, the third fluid stream comprising predominately of separated solids exits through outlet 97 (see FIG. 2B) positioned about the top portion of the apparatus.

In various embodiments, liquid separator apparatus 22 includes first screen assembly 30 for screening fluids from a slurry. First screen assembly 30 defines an enclosure therein. In one embodiment, first screen assembly 30 has a cylindrical shape wherein the inner diameter the first screen assembly 30 can have any appropriately configured size as is needed for the application at hand, with the inner diameter varying from few inches to several feet. The apparatus 22 also includes a second screen assembly 34 for screening fluids from the slurry and being disposed spaced-apart within the first screen assembly 30. Similar to the first screen assembly 30, in one embodiment, second screen assembly 34 has a cylindrical shape, wherein the diameter of second screen assembly 34 can be any appropriately configured size as is suitable for the application at hand, with the diameter varying from few inches to several feet. In one embodiment, the first screen assembly 30 and the second screen assembly 34 are coaxially aligned.

As will be readily appreciated by persons of ordinary skill in the art, selection of the minimum and maximum diameter values for any particular application will depend on factors including the diameter of the auger, the desired speed at which the auger will be rotated, and the nature of the slurry material being processed, including the compressibility and the average size of the solid material components of the slurry material. As an illustrative example, in one example, the first screen assembly 30 is cylindrically shaped and having a diameter of at least 10 inches, and the second screen assembly 34 is cylindrically shaped and having a diameter of at most 9 inches, wherein the first screen assembly 30 and the second screen assembly 34 are coaxially aligned. In another example, the first screen assembly 30 is cylindrically shaped and has an inner diameter of about 11 inches, with the second screen assembly 34 being cylindrically shaped and having an outer diameter of about 8 inches. In this manner, the slurry pathway 36 has a spacing of approximately 1.5 inches between the first screen assembly 30 and the second screen assembly 34 in one implementation. In various embodiments, each of the first screen assembly 30 and the second screen assembly 34 can be formed of any suitable material such as, for example, a metallic material. In one embodiment, each of the first screen assembly 30 and the second screen assembly 34 may be formed from a wedge-wire construction having about a twenty-thousandths of an inch clearance between adjacent wires; other clearances are also contemplated.

Apparatus 22 can further include a housing 28 for enclosing and/or otherwise providing structural support to the first screen assembly 30 and the second screen assembly 34. In one implementation, first screen assembly 30 and second screen assembly 34 are fixedly secured to suitable supports or frames that constitute (i.e., form part of) housing 28. Apparatus 22 further includes at least one screw or auger such as auger 44 provided between the second screen assembly 34 and the first screen assembly 30 for advancing the slurry through the slurry pathway 36. In one embodiment, the apparatus 22 is configured for advancing the slurry in an upward direction. Apparatus 22 can further include a sludge pump 92 for pumping slurry upwards through apparatus 22. In one embodiment, the sludge pump 92 is a progressive cavity pump.

In some embodiments, apparatus 22 further includes an in-line polymer injection pump or module such as polymer injection module 214 (see FIG. 9) for adding a polymer to the slurry. The addition of the polymer to the slurry can assist in a more effective separation of fluids from the slurry, for example, by causing solid substances to bind together, precipitate or otherwise separate from the liquid solutions and colloidal mixtures present in the slurry. In some embodiments, the polymer can comprise a liquid comprising one or more chemical molecules such as, for example, a polyacrylamide (PAM) polymer flocculant.

Apparatus 22 can also include a drive motor 50 for rotating auger 44 for moving slurry upwards through the slurry pathway within apparatus 22. In some embodiments, drive motor 50 may turn the auger 44 via a belt and gear mechanism 96, or a similar other driving mechanism. In some embodiments, a pair of belt and gear mechanisms 96 may be provided as shown in FIG. 2—one proximate a top portion of apparatus 22 and another proximate a bottom portion of apparatus 22. This can advantageously apply a uniform torque throughout the height of the apparatus. In one embodiment, drive motor 50 operates to turn a spindle 95, which in turn, operates to turn the auger 44 via belt and gear mechanism(s) 96. Accordingly, in some embodiments, a drive motor or similar other drive assembly can operate to turn the auger through a belt and pulley drive mechanism or a similar other mechanism. In some embodiments, the blade of the auger 44 defines a helical plane.

Figure 3:
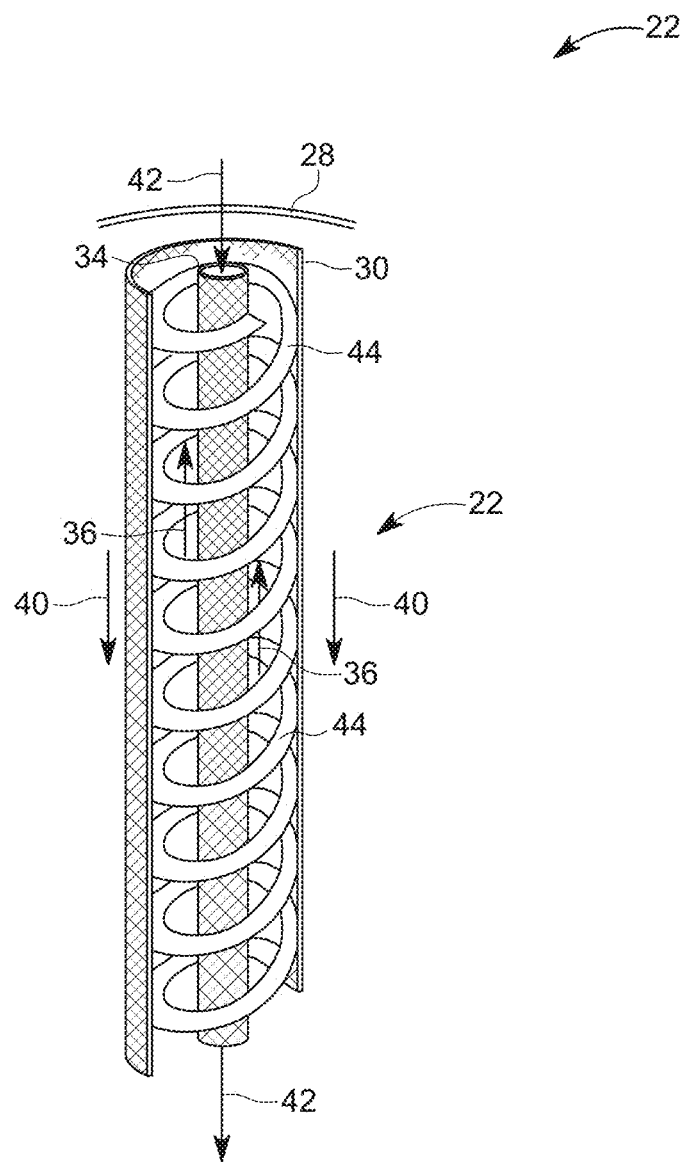
FIG. 3 illustrates a perspective view of an auger positioned between a first screen assembly and a second screen assembly of a single liquid separator apparatus, according to one or more embodiments of the presently disclosed subject matter.

With reference to FIG. 3, a slurry pathway 36 is defined between the first screen assembly 30 and the second screen assembly 34 of the apparatus is illustrated. A first separated fluids stream pathway 40 is defined outwardly of the first screen assembly 30. A second separated fluids stream pathway 42 is defined inwardly of the second screen assembly 34. In one embodiment, auger 44 may be in the form of an auger blade assembly as illustrated in FIG. 3, with auger 44 being configured for advancing the slurry through the apparatus 22. In various embodiments, auger 44 can be configured to be within a finitely close orientation relative to the inner facing portion of the first screen assembly 30. In at least one embodiment, the first screen assembly 30 and the second screen assembly 34 are configured to remain stationary due to them being securely fixed to at least one of a top portion and a bottom portion of housing 28. The auger 44 is configured to be turned by drive motor 50, while the first screen assembly 30 and the second screen assembly 34 remain stationary. Accordingly, while auger 44 rotates, the first screen assembly 30 and the second screen assembly 34 remain stationary.

In some embodiments, one or both of the first screen assembly 30 and the second screen assembly 34 can be configured to rotate in a direction opposite to the direction of rotation of auger 44; in such embodiments, one or both of the first screen assembly 30 and the second screen assembly 34 are provided with appropriate drive mechanisms similar to the drive mechanism that operates to rotate augur 44 to accomplish the rotation of one or both of the first screen assembly 30 and the second screen assembly 34.

Figure 10:
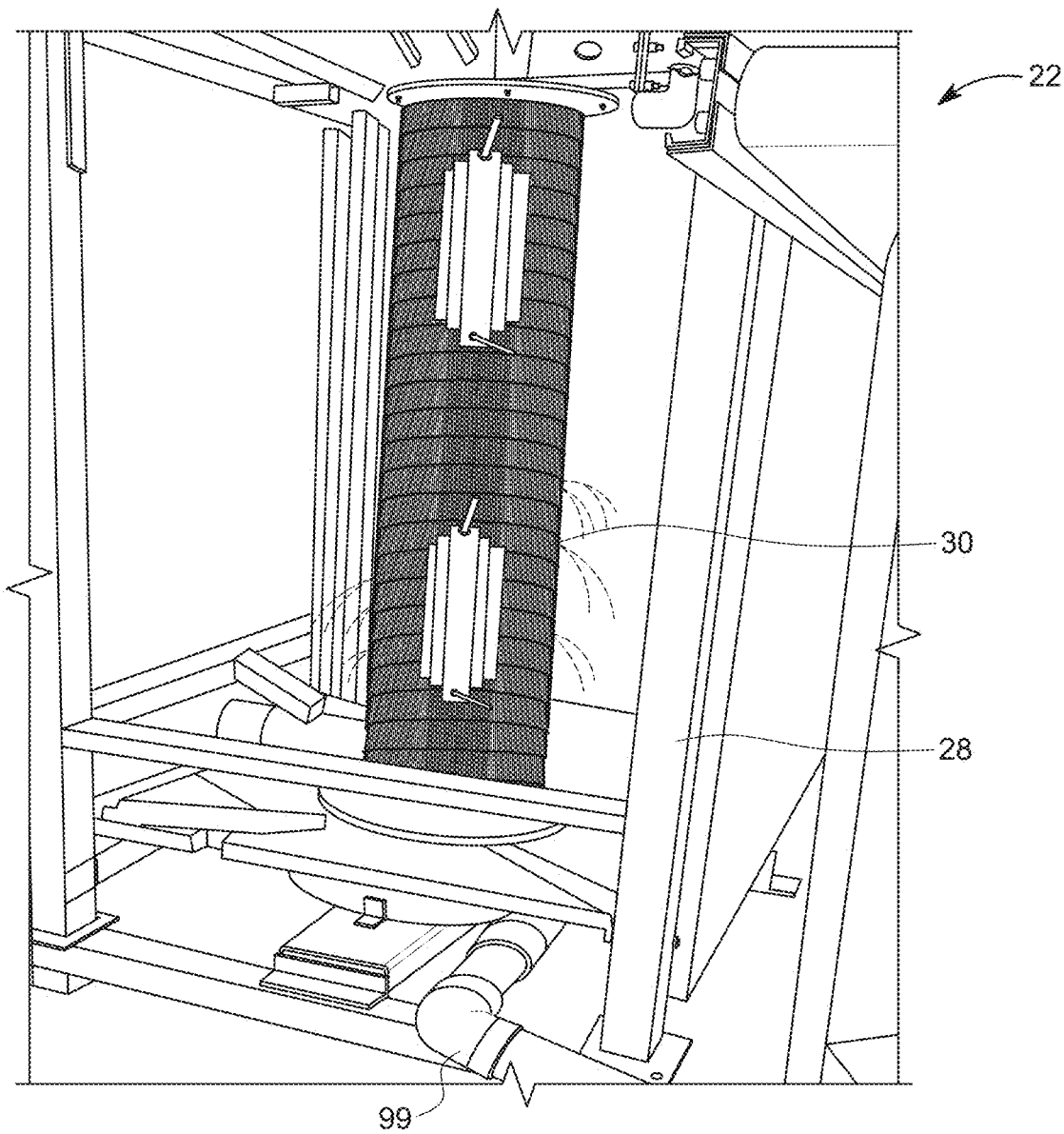
FIG. 10 is a front perspective view of a portion of a liquid separator apparatus including a housing, according to one or more embodiments of the presently disclosed subject matter.
Figure 11:
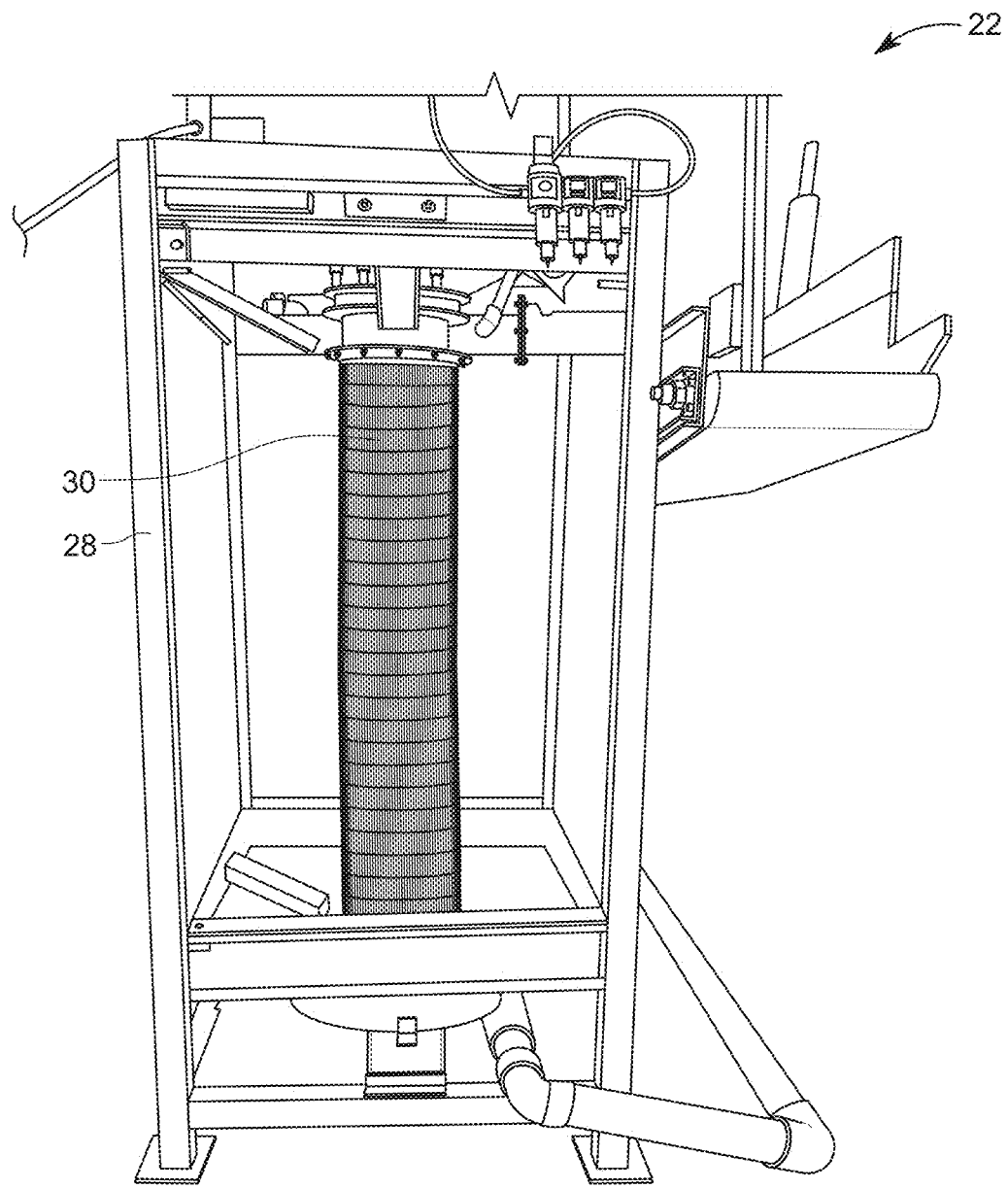
FIG. 11 is a front perspective view of a liquid separator apparatus including a housing, according to one or more embodiments of the presently disclosed subject matter.

In various embodiments, housing 28 that forms the outer frame, envelope or enclosure of apparatus 22 can take various configurations as dictated by the needs of the application at hand. For example, in the FIG. 2 embodiment, housing 28 has a more or less square cross-section. Further, housing 28 need not fully cover the full height of the first screen assembly 30. In one example, as shown in FIG. 10 and FIG. 11, housing 28 can be in the form of a frame assembly that supports the various components of apparatus 22. In some alternate embodiments, the housing 28 may be configured for completely enclosing the first screen assembly 30 and the second screen assembly 34. In some embodiments, housing 28 can have a cylindrical shape.

In various embodiments, apparatus 22 can further include a conveyor assembly 23 (see FIG. 2A) positioned at or near a top portion of the apparatus, with conveyor assembly 23 being in communication with the slurry pathway for conveying separated plug of material away from the apparatus. Conveyor assembly 23 accordingly can be in communication with the slurry pathway 36 for transporting the processed waste to an additional processing site. In one example, conveyor assembly 23 includes a chute or any other appropriately configured conveyor component to facilitate the extraction or conveyance of separated plug of material away from the apparatus.

Figure 4:
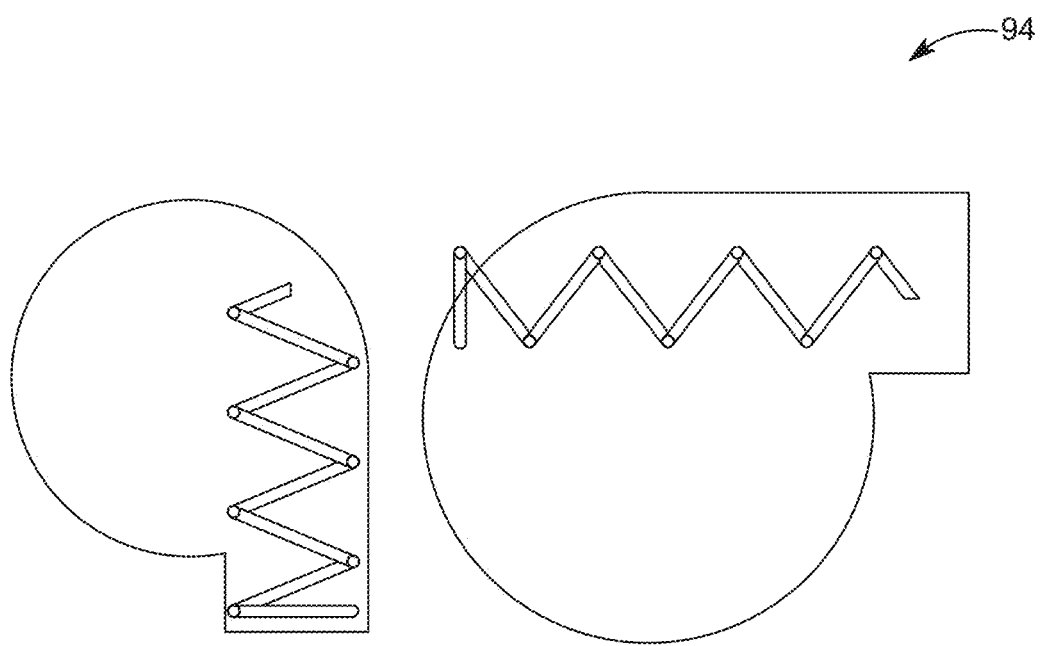
FIG. 4 is a schematic illustration of a discharge augur forming part of a system for treating slurry, according to one or more embodiments of the presently disclosed subject matter.
Figure 5:
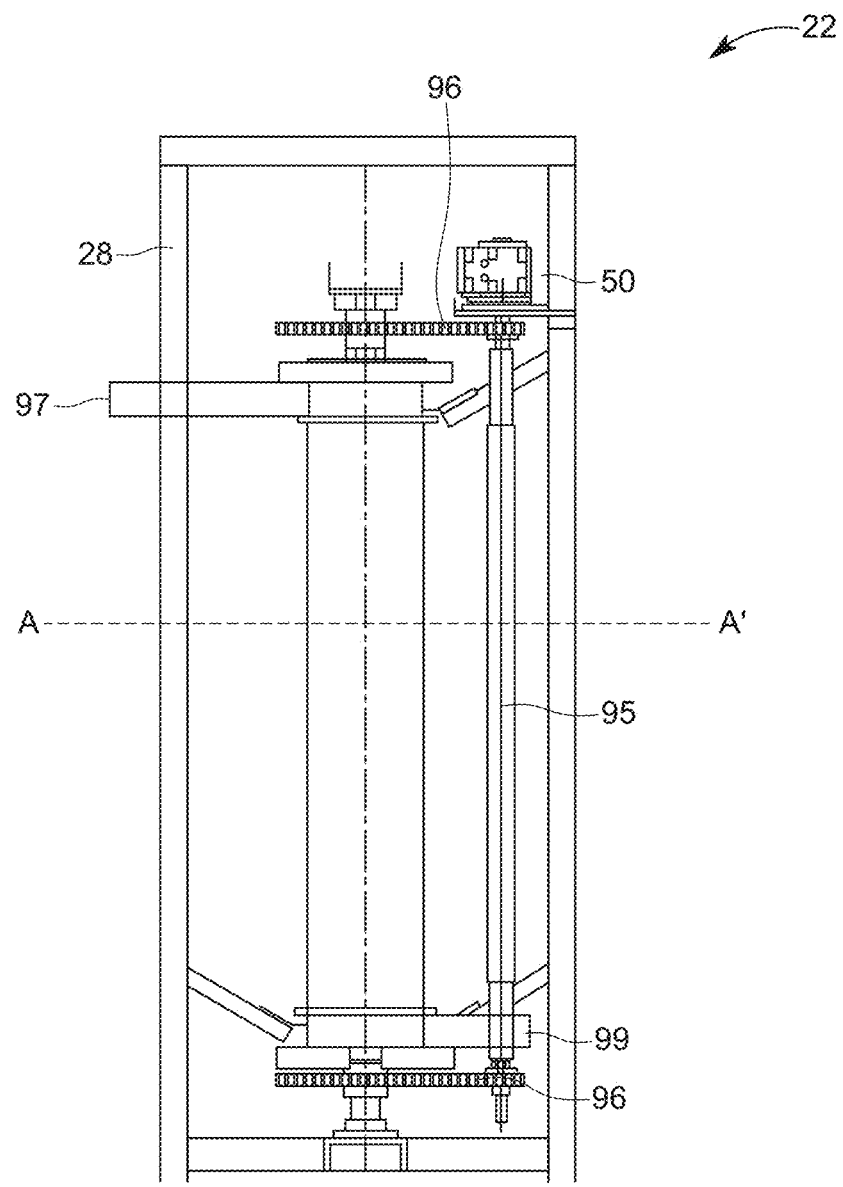
FIG. 5 illustrates a front plan view of a liquid separator apparatus forming part of a system for treating slurry, according to one or more embodiments of the presently disclosed subject matter.
Figure 6:
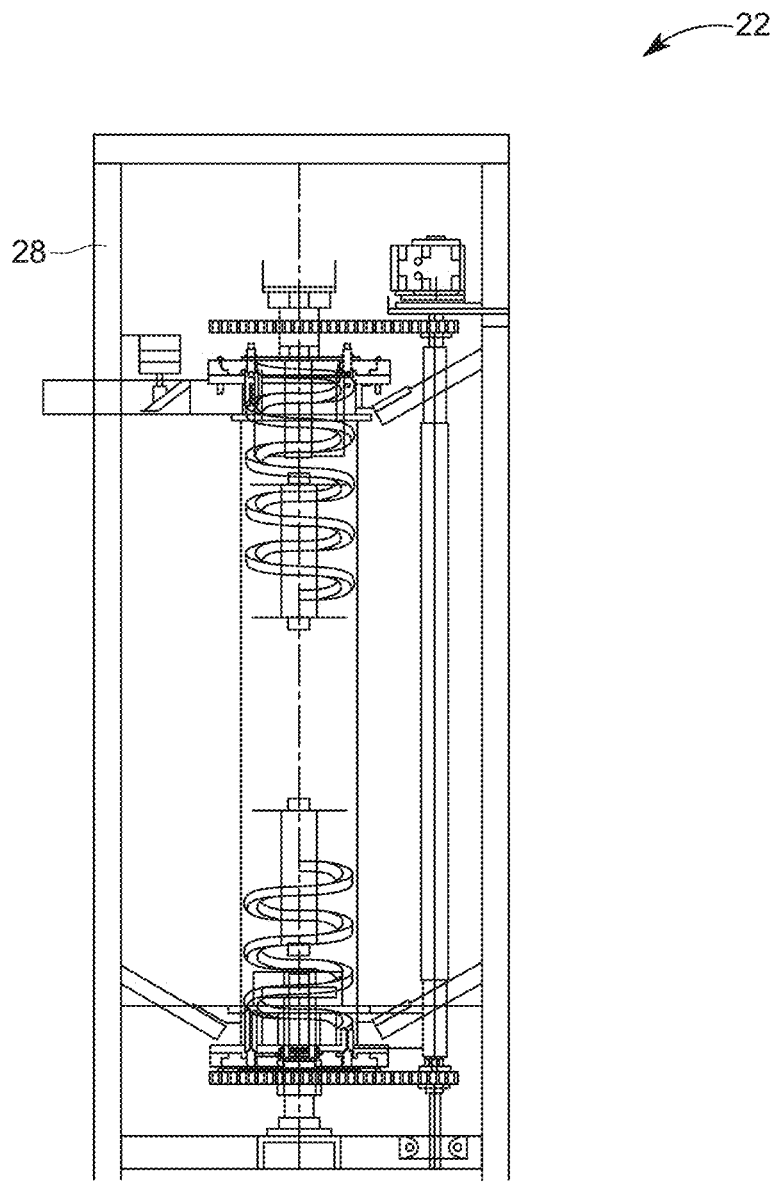
FIG. 6 illustrates a front plan view of a liquid separator apparatus forming part of a system for treating slurry with a portion of the first screen assembly, the second screen assembly, and the auger removed for clarity, according to one or more embodiments of the presently disclosed subject matter.
Figure 7:
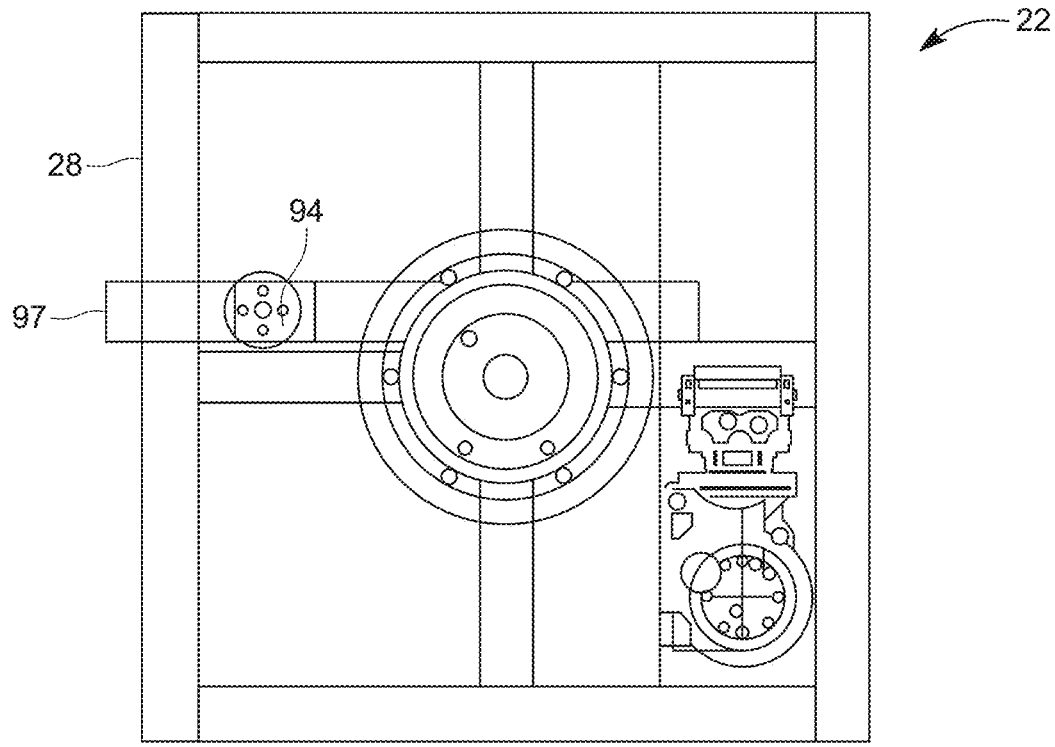
FIG. 7 illustrates a top plan view of a liquid separator apparatus as viewed at a mid-height level that is cut along line A-A' of FIG. 5, according to one or more embodiments of the presently disclosed subject matter.
Figure 8:
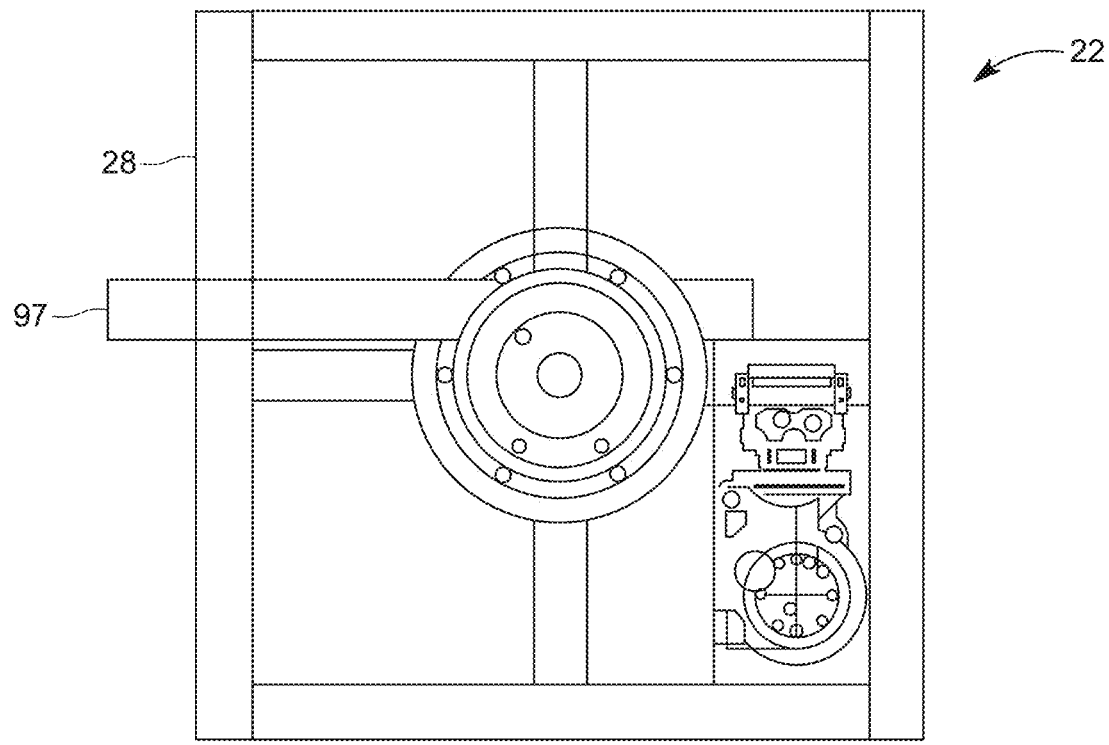
FIG. 8 illustrates a top plan view of a liquid separator apparatus, according to one or more embodiments of the presently disclosed subject matter.

As illustrated in FIG. 4 and FIG. 7, in some embodiments, system 10 further includes a discharge auger 94 positioned at or near a top portion of apparatus 22, with discharge auger 94 being in fluid communications with an exit region of the slurry pathway for supporting or accelerating the exit of separated plug of material away from the apparatus 22.

Apparatus 22 can further include a vacuum source or a negative pressure source in communication with at least one of the first separated fluids stream pathway and the second separated fluids stream pathway to vacuum out the separated fluids. In one embodiment, the vacuum or negative pressure source is in communication with the second separated fluids stream pathway 42. In this manner, the vacuum pressure source can operate to induce a pressure bias for accelerating the separation of fluids from the slurry pathway 36. Similarly, the same or a second vacuum source is in communication with the first separated fluids stream pathway 40 for also inducing a pressure bias for accelerating the separation of fluids from the first separated fluids stream pathway 40. Additionally, a low-pressure source or a negative pressure source can be provided in communication with the slurry pathway 36 for providing a pressure bias to force separated liquids into one of the first separated fluids stream pathway 40 and the second separated fluids stream pathway 42. In one embodiment, the low-pressure source can be, for example, a compressed air source of about ten (10) pounds per square inch (PSI).

Figure 9:
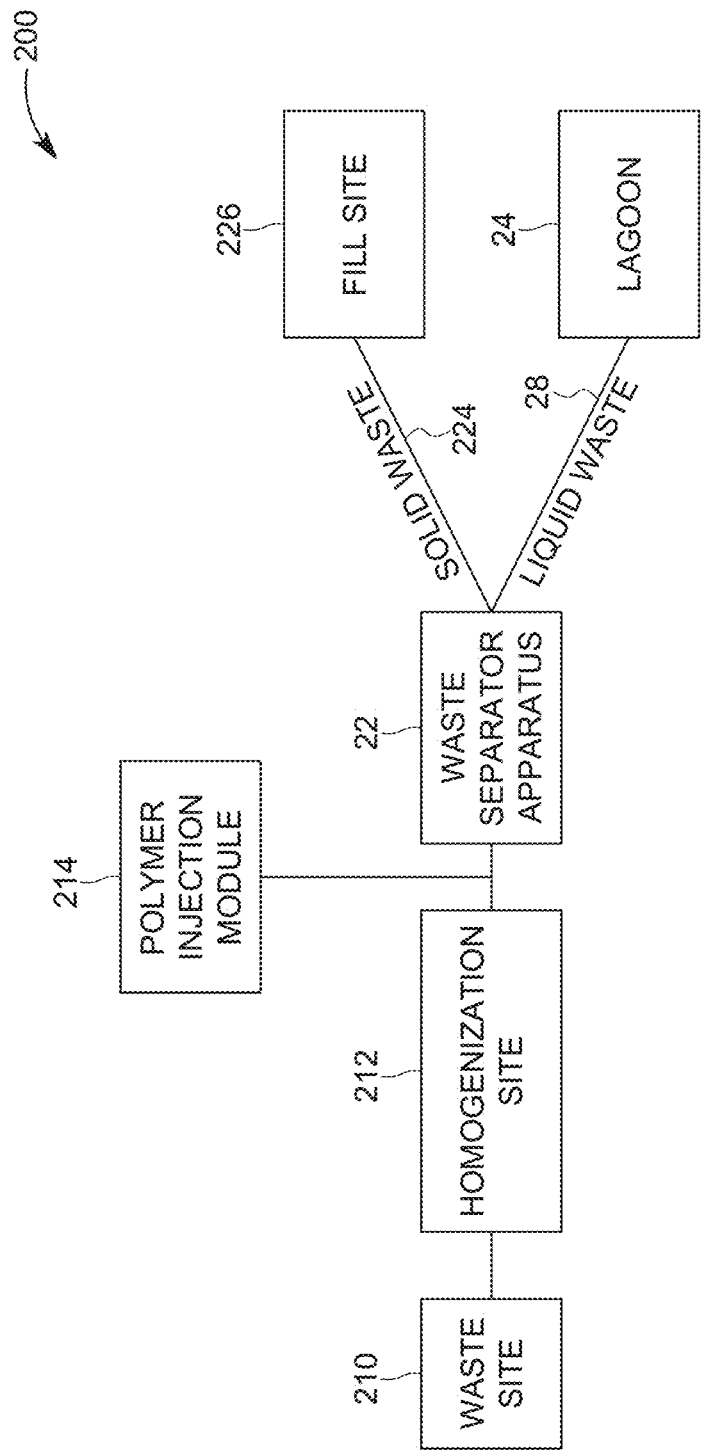
FIG. 9 is a schematic flow-chart illustrating one or more systems that may be employed with the liquid separator apparatus, according to one or more embodiments of the presently disclosed subject matter.

FIG. 9 illustrates a schematic flow-chart showing one or more systems that may be employed with apparatus 22 as provided herein. According to one embodiment, system 200 as illustrated in FIG. 9 can include a waste site 210 that may be, for example, represent a swine site or other site as described with relation to system 10 illustrated in FIG. 1. The system 200 can further include a homogenization site 212. The homogenization site 212 can include a mixer, strainer tank or similar configured for creating slurry of a generally uniform texture (i.e., a slurry of homogenous character) at its outlet. A polymer injection unit 214 can also be provided. In one embodiment, the polymer injection unit 214 can operate to inject polyacrylamide (PAM) polymer flocculant into the slurry to act as a binder for removing additional solids from the slurry. A nitrification and/or denitrification unit can also be employed either upstream or downstream of the polymer injection unit 214, but upstream of the apparatus 22. Liquid separator apparatus 22 then processes the slurry into respective waste streams, with a plug of material (i.e., a solid waste stream 224) being taken to a fill site 226 or a similar other location, and a liquid waste stream 228 being transported to a lagoon 24 or a similar other suitable location.

Figure 12:
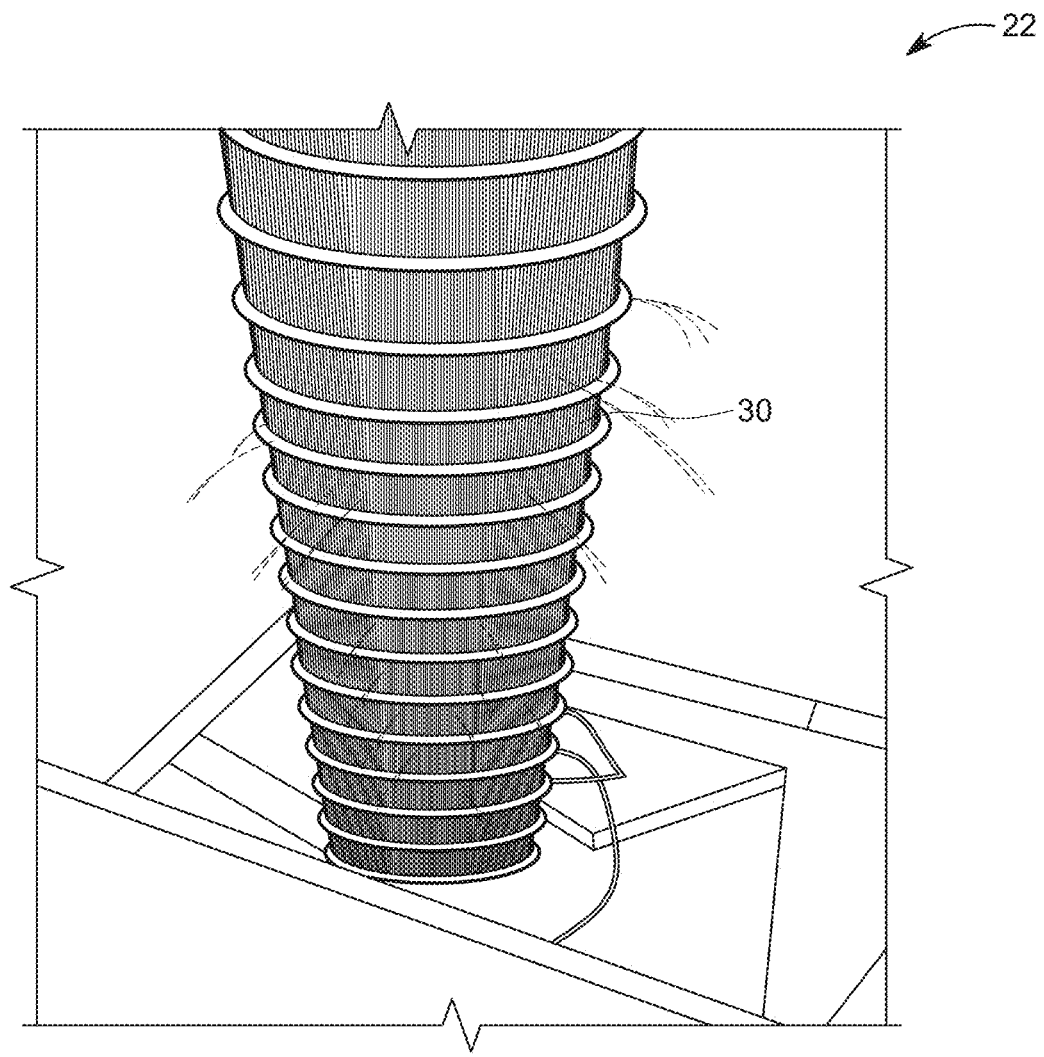
FIG. 12 is a front perspective view of a first screen assembly of the liquid separator apparatus including a housing, according to one or more embodiments of the presently disclosed subject matter.

FIGS. 10 through 12 illustrate perspective views of liquid separator apparatus 22. In particular, FIG. 12 illustrates a front perspective view of a first separated fluids stream exiting via the first separated fluids stream pathway defined outwardly of the first screen assembly of the liquid separator apparatus.

Figure 13:
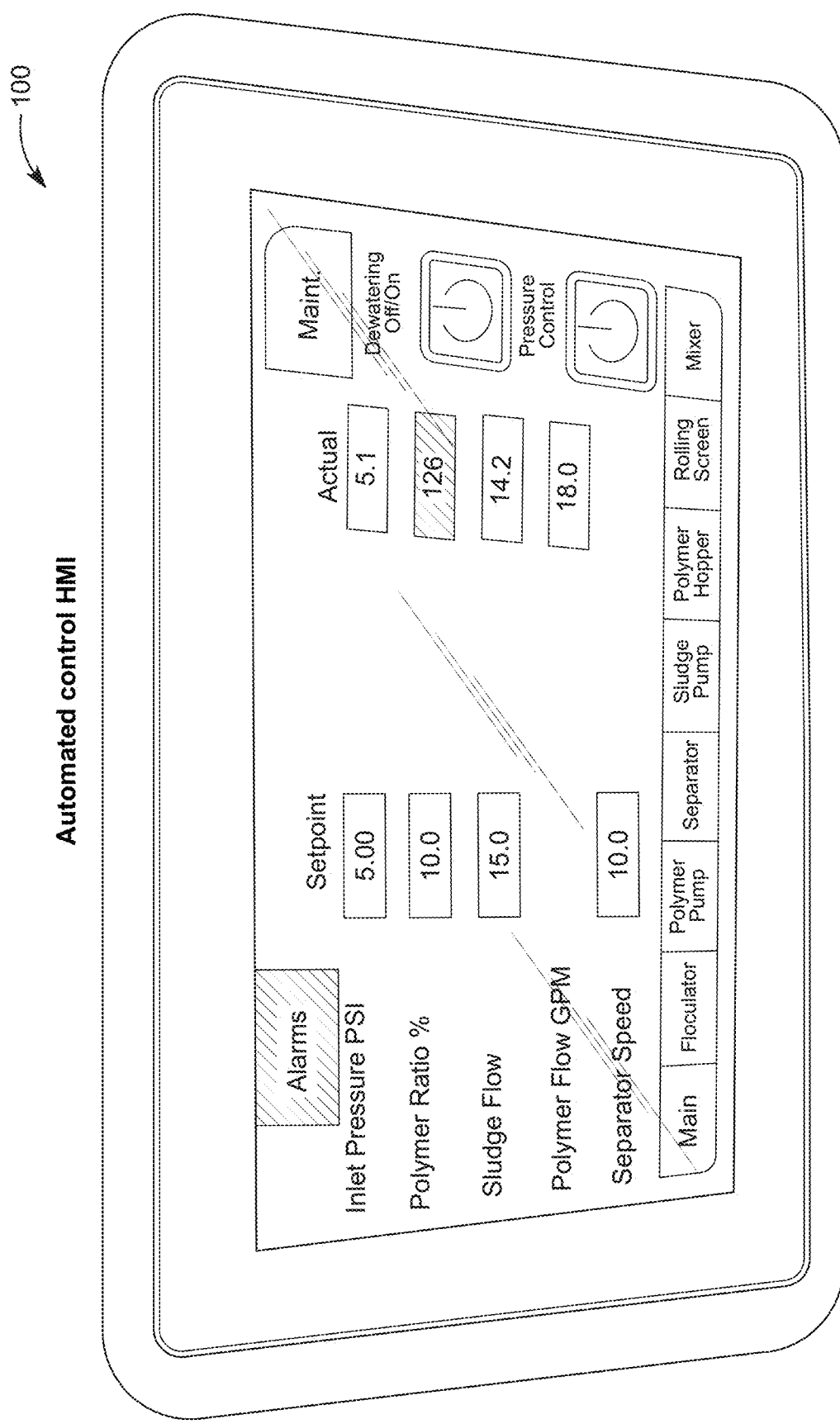
FIG. 13 illustrates a perspective view of a user interface of an automated control system forming part of a system for treating slurry, according to one or more embodiments of the presently disclosed subject matter.

In various embodiments, system 10 is configured to operate in an automated manner through the provision of an automated control system for an automated process of removing liquid from slurry. FIG. 13 illustrates a user interface 100 of automated control system. The automated control system monitors and controls the operations of a system 10 for treating slurry such as a waste fluid stream animal as described above. The automated control system further monitors and controls the operations of a liquid separator apparatus such as apparatus 22 described above. As illustrated in FIG. 13, the automated control system can include a user interface 100 configured for receiving a user input as well as for providing output readable by a user. The automated control system further includes a controller configured to adjust at least one operating parameter associated with the liquid separator apparatus responsive to the user input received at the user interface. The controller is configured for receiving electronic signals from and sending electronic signals to the various components of apparatus 22 and of system 10 to facilitate the automated monitoring and controlling of the operations of system 10 in general, and liquid separator apparatus 22 in particular. For example, system 10 can further include a power on/power off actuator for turning the apparatus on and off, a slurry or grease flow monitor for monitoring the flow of grease, a slurry flow meter of metering the slurry flow, a polymer flow monitor for monitoring the addition of polymer to the slurry, a polymer ratio tracker, a sludge flow monitor, an inlet pressure sensor, a auger speed control and monitor, a dewatering control and monitor, and a slurry pressure control meter for monitoring and controlling the slurry pressure, among others, with the controller configured to communicate with each of these components for performing monitoring and controlling of the operations of the system 10.

In various embodiments, apparatus 22 can further include a flow restriction apparatus positioned about a top portion of the slurry pathway for restricting flow-through from outlet 97 of the apparatus until one or more desired parameters are reached. In one embodiment, the flow restriction apparatus is in the form of a pneumatic restriction system that operates in combination with other components of liquid separator apparatus 22 to maintain a predetermined characteristic of the separated solids exiting from the apparatus 22. The pneumatic restriction system can include a restrictor gate that is configured for being a first, closed position and a second, open position. The restrictor gate can also include other intermediate position settings. The restrictor gate can be controlled by an actuator. The actuator can be a pneumatic actuator in one or more embodiments, and, may alternatively be an electric, mechanical, or other appropriately configured actuator. A control module may be provided in communication with the actuator and configured for providing controls or control signals for operating or otherwise controlling the actuator. In this manner, the pneumatic restriction system can be configured for closing off a top portion of the slurry pathway 36 in order to provide for a buildup of pressure as additional waste fluids are injected into the slurry pathway of apparatus 22. This feature can advantageously help in wringing out more moisture or fluids from the slurry as the slurry is urged by auger 44 to advance upwardly through the slurry pathway.

In some embodiments, the control module can include a sensor that is configured for detecting a pressure, weight, and similar other physical characteristics of the slurry as it makes its way through the slurry pathway 36; the control module may instruct the actuator to open the restrictor gate upon reaching a desired pressure, weight, or similar other physical characteristics with regard to the slurry. Slurry is then allowed to exit the apparatus 22 through exit 97 as a plug of material such as solid waste stream 224 depicted in FIG. 9. The control module can then instruct the actuator to close the restrictor gate partially or completely until the desired pressure, weight, or similar is again reached with regard to the slurry upon buildup of slurry material within the slurry pathway 36. In one embodiment, the control module can be configured to instruct the actuator to operate the restrictor gate such that it opens or begins to open at about 40 pounds per square inch of pressure sensed at a position directly upstream of the restrictor gate.

As shown in FIG. 13, the user interface 100 of the automated control system can be configured for displaying various operating parameters associated with the operations of the system 10 in general and liquid separator apparatus 22 in particular. In one implementation, user interface 100 is capable of displaying information such as: a slurry pressure at an inlet 99 to the apparatus, a slurry flow rate at the inlet 99 to the apparatus, a flow rate of a plug of material at an outlet 97 from the apparatus, a turning rate of the auger 44, and a rate of addition of a polymer to the slurry, among other pieces of information.

FIG. 14 illustrates an example of the results obtained by processing swine waste through one embodiment of the liquid separator apparatus 22. The results indicate that a high percentage of moisture gets removed from the slurry by use of system 10, the apparatus, the automated control system including the control module as described herein.

Accordingly, embodiments of the presently disclosed subject matter can advantageously provide dairy and swine farmers an efficient solid-liquid separating and dewatering machine to help them turn an enormous environmental problem into a value generating enterprise. With more solid throughput for less cost while reducing the moisture level to the required percentage, the farmers now have a choice for controlling the quality and quantity of fluid discharge that reaches the onsite lagoon at a swine farm site. The farmers may now be able to generate biogas (e.g., methane) by composting the dried plug of material. Also, a horticulturalist can use the composted manure as a natural substitute for artificially manufactured fertilizer. Through the methods and apparatus described herein, farmers can reduce the nutrient loading of the lagoons, the leeching of phosphorous into our ground water, and the releasing of methane into the atmosphere, in addition to other direct monetary advantages.

While the invention has been described primarily with regard to animal waste, embodiments of the presently disclosed subject matter is not limited to only such applications. Indeed, the term slurry as used herein can also include lignocellulosic feedstock slurry. By the term "lignocellulosic feedstock" means any type of woody or non-woody plant biomass, or feedstock derived from plant biomass, such as, but not limited to, dedicated biomass crops such as, but not limited to grasses, for example, but not limited to, C4 grasses, such as switch grass, cord grass, rye grass, miscanthus, reed canary grass, or a combination thereof; residues, byproducts or waste from the processing of plant biomass, or feedstock derived from plant biomass, in a facility to yield food or non-food products, for example, but not limited to, residues remaining after obtaining sugar from plant biomass such as sugar cane bagasse, beet pulp, or residues remaining after removing sugar from Jerusalem artichoke, or a combination thereof; residues remaining after grain processing, such as corn fiber or corn stover; agricultural residues, for example, but not limited to, soybean stover, corn stover, rice straw, sugar cane straw, rice hulls, barley straw, corn cobs, wheat straw, canola straw, oat straw, oat hulls, corn fiber, or a combination thereof; forestry biomass for example, but not limited to, recycled wood pulp fiber, sawdust, hardwood, for example aspen wood, softwood, or a combination thereof; waste material derived from pulp and paper products such as newsprint, cardboard, or a combination thereof; and municipal waste, including sewage sludge.

For example, the embodiments of the presently disclosed subject matter can be advantageously be used in applications that require removal of liquid from slurry bulk materials including wood chips, livestock manure, byproducts of food processing operations, or other fibrous materials. Embodiments of the presently disclosed subject matter can also be used for processing raw mixtures of moist organic matter, that yield both an organic-rich fluid, which can be used for the production of methane gas, for example, and a shaped, residual waste, in the form of dry solid refuse derived fuel (RDF) pellets for commercial or industrial use as renewed energy materials.

Embodiments of the presently disclosed subject matter can also be used to process wet municipal solid waste. Wet municipal solid waste is often characterized by high moisture content and capable of rapid spoilage and/or putrefaction, with municipal solid waste including domestic waste, industrial waste and/or agricultural waste, among others.

Embodiments of the presently disclosed subject matter can also be used for processing material components with high humidity such as straw, grass, and the like. Embodiments of the presently disclosed subject matter can further be used for processing raw materials used in the manufacture of edible oils. Embodiments of the presently disclosed subject matter can also be used in the production of mechanical pulp and other organic material of plant and/or animal origin.

Downstream of removing liquid from the slurry, the plug of material may be subjected to various treatments to produce a biofuel or other chemical, including thermal, chemical, mechanical and/or biologic treatments. In the case of lignocellulosic feedstocks or other organic material, such treatments can involve liberation of sugar from the feedstock, followed by conversion of the sugar into a fuel or chemical.

Although a few exemplary embodiments have been shown and described, it would be appreciated by those skilled in the art that changes may be made in these exemplary embodiments without departing from the principles and spirit of the invention, the scope of which is defined in the claims and their equivalents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

Although a few exemplary embodiments have been shown and described, it would be appreciated by those skilled in the art that changes may be made in these exemplary embodiments without departing from the principles and spirit of the invention, the scope of which is defined in the claims and their equivalents.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Any methods, devices, and materials similar or equivalent to those described herein can be used in the practice or testing of the presently disclosed subject matter, representative methods, devices, and materials as described.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A liquid separator apparatus comprising:
    a first screen assembly for screening fluids from slurry, the first screen assembly defining an enclosure;
    a second screen assembly for screening fluids from the slurry and being disposed spaced-apart within the enclosure of the first screen assembly;
    a slurry pathway defined between the first screen assembly and the second screen assembly;
    a first separated fluids stream pathway defined outwardly of the first screen assembly;
    a second separated fluids stream pathway defined inwardly of the second screen assembly;
    an auger positioned between the first screen assembly and the second screen assembly for advancing the slurry upwardly through the slurry pathway; and
    a drive motor for turning the auger,
    wherein the first screen assembly and the second screen assembly are fixedly secured.

2. The liquid separator apparatus according to claim 1, further comprising a housing for enclosing the first screen assembly and the second screen assembly.

3. The liquid separator apparatus according to claim 1, further comprising a pump for pumping the slurry to the liquid separator apparatus.

4. The liquid separator apparatus according to claim 3, wherein the pump is a progressive cavity pump.

5. The liquid separator apparatus according to claim 1, wherein the drive motor turns the auger through a belt and pulley drive mechanism.

6. The liquid separator apparatus according to claim 1,
    wherein the first screen assembly is cylindrically shaped and having a diameter of at least 10 inches,
    wherein the second screen assembly is cylindrically shaped and having a diameter of at most 9 inches, and
    wherein the first screen assembly and the second screen assembly are coaxially aligned.

7. The liquid separator apparatus according to claim 1, further comprising a vacuum source in communication with at least one of the first separated fluids stream pathway and the second separated fluids stream pathway.

8. The liquid separator apparatus according to claim 1, wherein a blade of the auger defines a helical plane.

9. The liquid separator apparatus according to claim 1, wherein each of the first screen assembly and the second screen assembly defines a wedge wire mesh having about a twenty-thousandths of an inch clearance.

10. The liquid separator apparatus according to claim 1, further comprising a conveyor positioned about a top portion of the apparatus in communication with the slurry pathway for conveying separated plug of material away from the apparatus.

11. The liquid separator apparatus according to claim 1, further comprising a discharge auger positioned about a top portion of the apparatus in communication with the slurry pathway for conveying separated plug of material away from the apparatus.

12. The liquid separator apparatus according to claim 1, further comprising a flow restriction apparatus positioned about a top portion of the slurry pathway for restricting flow-through until a desired parameter is reached.

13. The liquid separator apparatus according to claim 1, further comprising an in-line polymer pump for adding a polymer to the slurry.

14. An automated system for removing liquid from slurry, comprising:
    a liquid separator apparatus comprising:
    a first screen assembly for screening fluids from slurry, the first screen assembly defining an enclosure;
    a second screen assembly for screening fluids from the slurry and being disposed spaced-apart within the first screen assembly;
    a slurry pathway defined between the first screen assembly and the second screen assembly;
    a first separated fluids stream pathway defined outwardly of the first screen assembly;
    a second separated fluids stream pathway defined inwardly of the second screen assembly;
    an auger positioned between the first screen assembly and the second screen assembly for advancing the slurry upwardly through the slurry pathway; and
    a drive motor for turning the auger;
    a user interface configured for receiving a user input; and
    a controller configured to adjust at least one operating parameter associated with the liquid separator apparatus responsive to the user input received at the user interface;
    wherein the first screen assembly and the second screen assembly are fixedly secured.

15. The automated system of claim 14, wherein the operating parameter comprises at least one of: a slurry pressure at an inlet to the apparatus, a slurry flow rate at the inlet to the apparatus, a flow rate of a plug of material at an outlet from the apparatus, a turning rate of the auger, and a rate of addition of a polymer to the slurry.

16. A system for treating a waste fluid stream, the system comprising:
    a waste site having a slurry output, the slurry including a waste fluid stream;
    a liquid separator apparatus configured for separating the slurry into respective separated fluid streams, the liquid separator apparatus comprising:
    a first screen assembly for screening fluids from a slurry, the first screen assembly defining an enclosure;
    a second screen assembly for screening fluids from the slurry and being disposed spaced-apart within the enclosure of the first screen assembly;
    a slurry pathway defined between the first screen assembly and the second screen assembly;
    a first separated fluids stream pathway defined outwardly of the first screen assembly;
    a second separated fluids stream pathway defined inwardly of the second screen assembly;
    an auger positioned between the first screen assembly and the second screen assembly for advancing the slurry upwardly through the slurry pathway;
    a drive motor for turning the auger; and
    a downstream processing unit configured for further processing of one of the first separated fluids stream and second separated fluids stream, wherein the first screen assembly and the second screen assembly are fixedly secured.

17. The system according to claim 16, further comprising a homogenization tank positioned between the waste site and the liquid separator apparatus.

18. The system according to claim 16, further comprising at least one of a denitrification unit and a nitrification unit, in fluid communication with the system.

19. The system according to claim 16, wherein the waste site is a livestock farm.

20. The system according to claim 16, further comprising a lagoon for storing separated liquids.

* * * * *